(12) United States Patent
Kojima

(10) Patent No.: US 8,267,133 B2
(45) Date of Patent: Sep. 18, 2012

(54) PNEUMATIC TIRE

(75) Inventor: Hiroyuki Kojima, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 604 days.

(21) Appl. No.: 12/354,560

(22) Filed: Jan. 15, 2009

(65) Prior Publication Data

US 2009/0188596 A1    Jul. 30, 2009

(30) Foreign Application Priority Data

Jan. 28, 2008 (JP) ................................ 2008-016454

(51) Int. Cl.
*B60C 11/00* (2006.01)
(52) U.S. Cl. ........... 152/209.3; 152/209.18; 152/209.21; 152/209.24; 152/209.27; 152/902
(58) Field of Classification Search ............... 152/209.3, 152/209.24, 209.27, 209.18, 209.21, 902, 152/DIG. 3
See application file for complete search history.

(56) References Cited

FOREIGN PATENT DOCUMENTS

| DE | 10145061 A1 | * | 4/2003 |
|----|-------------|---|--------|
| JP | 07061210 A  | * | 3/1995 |
| JP | A 2005-349851 | | 12/2005 |
| JP | 2006082586 A | * | 3/2006 |
| JP | A 2006-160055 | | 6/2006 |
| JP | S D1283701 | | 10/2006 |

* cited by examiner

*Primary Examiner* — Khanh P Nguyen
*Assistant Examiner* — Carson Gross
(74) *Attorney, Agent, or Firm* — Greer, Burns & Crain, Ltd.

(57) ABSTRACT

Lateral grooves 6 are disposed in a land portion 4 between main grooves 2 at prescribed intervals in a circumferential direction TC of the tire, the lateral grooves 6 extending from the main grooves 6 to a circumferential groove 5. Blocks 7 are defined by the main grooves 2, circumferential groove 5 and lateral grooves 6. At least two sub-grooves 8 are disposed in each block 7 at a prescribed interval in the tire circumferential direction TC, the sub-grooves 8 extending from a main groove 2 adjacent thereto in a width direction of the tire. At least three block portions 7A, 7B and 7C are formed. The width of the main groove 2 adjacent to the block 7 is varied by making the block widths Wa, Wb and Wc of the block portions 7A, 7B and 7C different from each other. A groove wall surface, facing the main groove, of a block portion less in width has a greater inclination angle with respect to a tread normal direction. This allows for provision of a pneumatic tire capable of improving steering stability on a dry road surface and on a snow road surface.

6 Claims, 5 Drawing Sheets

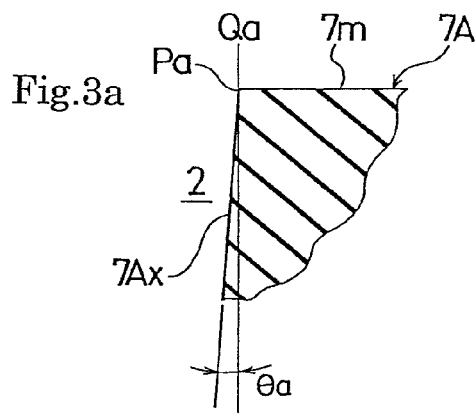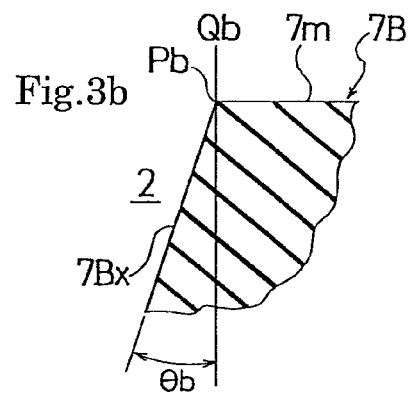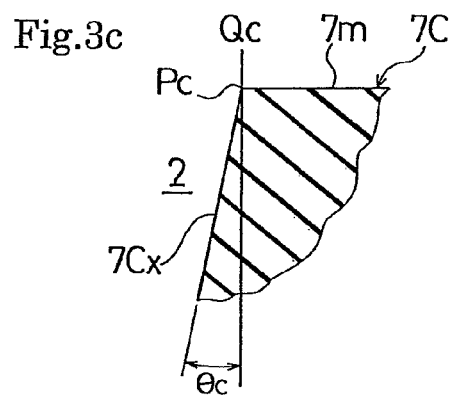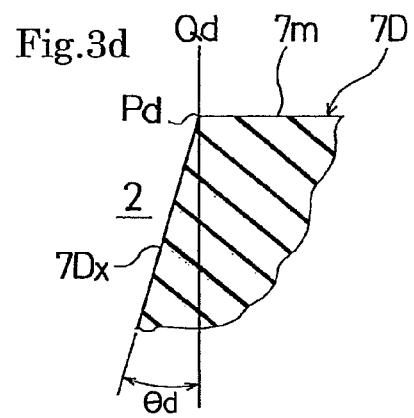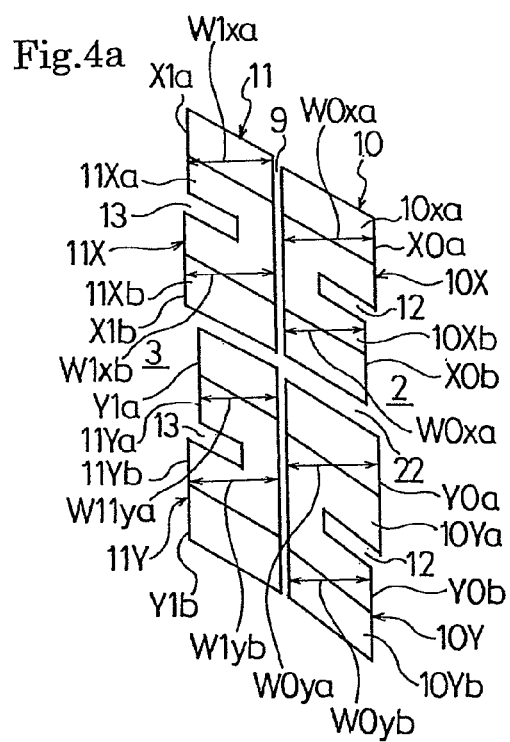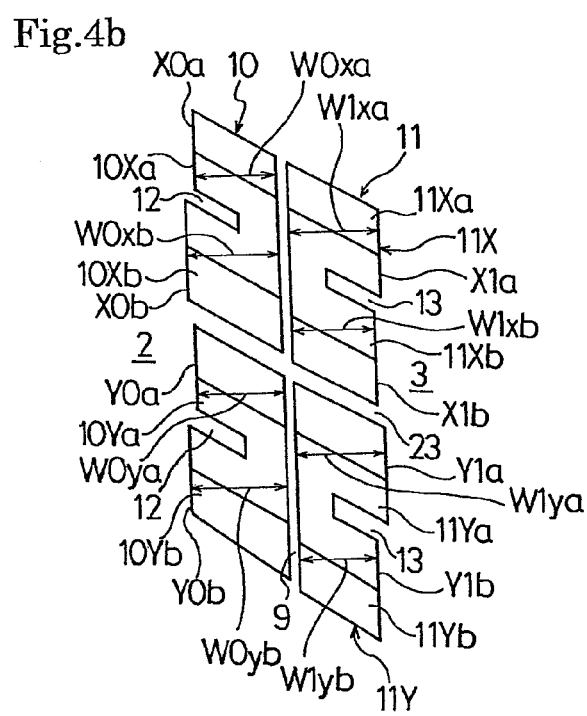

PNEUMATIC TIRE

BACKGROUND OF THE INVENTION

1. Field of the Invention

The present invention relates to pneumatic tires, and more particularly, to a pneumatic tire which can improve steering stability on a dry road surface and on a snowy road surface.

2. Description of the Related Art

Pneumatic tires for all seasons used through a year are used also during snowfall in winter. Therefore, in addition to good steering stability on a dry road surface, stable running performance on a snowy road surface is also required. Such pneumatic tires for all seasons obtain the both performances by adequately arranging positions of main grooves and lateral grooves, and shapes of land portions (see patent documents 1 and 2, and a design document 1, for example).

In recent years, in order to increase vehicle running safety, pneumatic tires are also required to have further improvements. The pneumatic tires for all seasons described above are also required to further improve steering stability on a dry road surface and on a snowy road surface.

Patent Document 1: Japanese Patent Application Kokai Publication 2005-349851

Patent Document 2: Japanese Patent Application Kokai Publication 2006-160055

Design Document 1: Japanese Design Registration 1283701

SUMMARY OF THE INVENTION

An object of the present invention is to provide a pneumatic tire capable of improving steering stability on a dry road surface and on a snowy road surface.

A pneumatic tire according to the present invention for achieving the above object has a tread surface, a plurality of main grooves extending in a circumferential direction of the tire in the tread surface, land portions being defined by the plurality of main grooves, the land portions having at least one land portion between two adjacent main grooves, a circumferential groove less in width than the main grooves extending in the tire circumferential direction in the at least one land portion, characterized in that; lateral grooves are disposed in the at least one land portion at prescribed intervals in the tire circumferential direction, the lateral grooves extending from each main groove adjacent to the at least one land portion to the circumferential groove; a plurality of blocks are defined by the main grooves, circumferential groove and lateral grooves; sub-grooves are disposed in each block at a prescribed interval in the tire circumferential direction, the sub-grooves extending from the main groove to at least a midway of the block in the tire width direction; at least three block portions are defined by the sub-grooves in the tire circumferential direction; the at least three block portions have widths different from each other in the tire width direction, whereby the main groove adjacent to the each block has a variable width; and the at least three block portions have groove wall surfaces facing the main groove, the groove wall surface of a block portion less in width having a greater inclination angle with respect to a tread normal direction.

According to the present invention mentioned above, an edge effect due to the sub-grooves provided in each of the blocks defined by the main grooves, circumferential groove and lateral grooves can be obtained, and expelling of snow which has entered into the main grooves can be facilitated by making the widths of the at least three block portions different from each other to vary the width of the main groove adjacent to the block. Therefore, steering stability on a snowy road surface can be enhanced.

On the other hand, the groove wall surface, facing the main groove, of a block portion less in width has a greater inclination angle with respect to the tread normal direction, whereby stiffness of each block portion in the tire width direction can be made more even. Therefore, steering stability on a dry road surface can be improved.

BRIEF DESCRIPTION OF THE DRAWINGS

FIGS. 3a to 3d are partial enlarged cross-sectional views of first to fourth block portions of a block between inner main grooves, respectively, taken in a plane that contains the axis of rotation of the tire.

FIG. 4a is an enlarged view of blocks between an inner main groove and an outer main groove on the left side of the equatorial plane of the tire.

FIG. 4b is an enlarged view of blocks between an inner main groove and an outer main groove on the right side of the equatorial plane of the tire.

DESCRIPTION OF THE PREFERRED EMBODIMENTS

Figure 1:
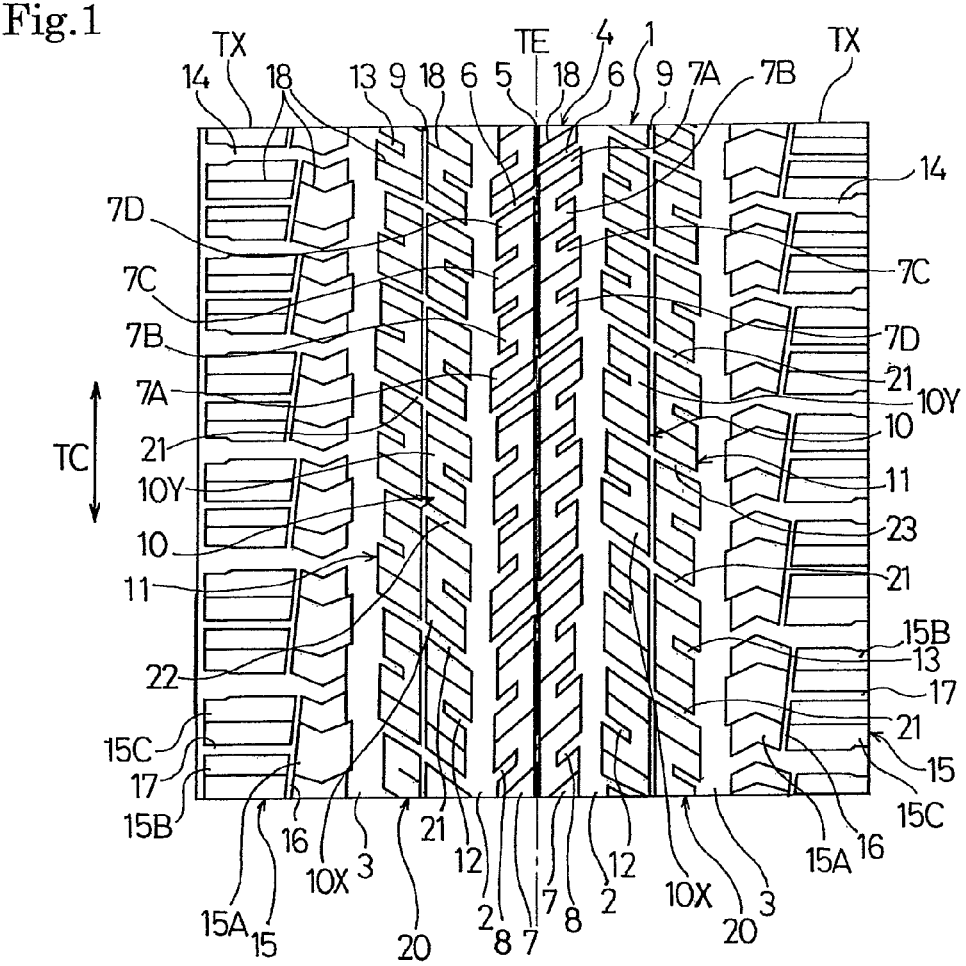
FIG. 1 is a partial development view of a tread surface showing an embodiment of a pneumatic tire according to the present invention.

FIG. 1 shows an embodiment of a pneumatic tire according to the present invention; reference numeral 1 denotes a tread surface. Four main grooves extending in a circumferential direction TC of the tire are provided in the tread surface 1. The four main grooves are disposed at symmetrical locations with respect to an equatorial plane TE of the tire, and comprise two inner main grooves 2 disposed on the opposite sides of the tire equatorial plane TE and two outer main grooves 3 disposed outwardly of the inner main grooves 2 in a width direction of the tire. A land portion 4 extending in the tire circumferential direction TC is formed between the inner main grooves 2 and a land portion 20 extending in the tire circumferential direction TC is formed between each two inner and outer main grooves 2 and 3.

A circumferential groove 5 less in width than the main grooves 2 and 3 extends straight in the tire circumferential direction TC on the tire equatorial plane TE located at the center, in the tire width direction, of the land portion 4 between the inner main grooves 2. Note that the circumferential groove 5 less in width than the main grooves 2 and 3 referred here is a circumferential groove having a width in the range of 0.2 mm to 2 mm. The depth of the circumferential groove 5 is 50% of the depths of the main grooves 2 and 3; the circumferential groove 5 is less in width than the main grooves. A circumferential groove 9 described later also has a similar structure to the circumferential groove 5.

First lateral grooves 6, which extend from each inner main groove 2 adjacent to the land portion 4 to the circumferential groove 5 in an inclined manner with respect to the tire width direction, are disposed in the land portion 4 at prescribed intervals longer (two times longer in the embodiment of FIG. 1) than those of third lateral grooves 14 described later in the tire circumferential direction TC. A plurality of blocks 7 are defined by the first lateral grooves 6, inner main grooves 2 and circumferential groove 5.

Figure 2:
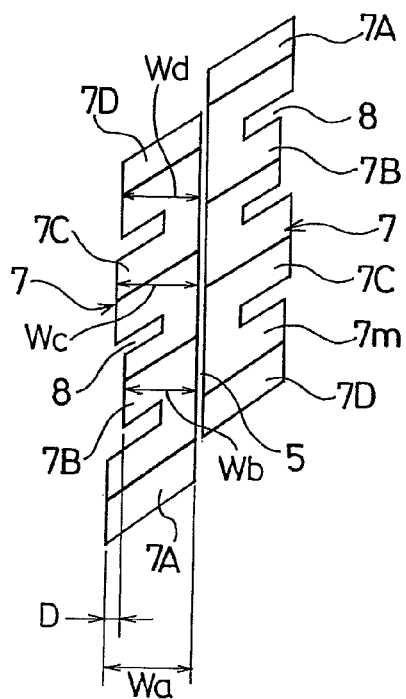
FIG. 2 is a partial enlarged view of the tread surface of FIG. 1.
Figure 5A:
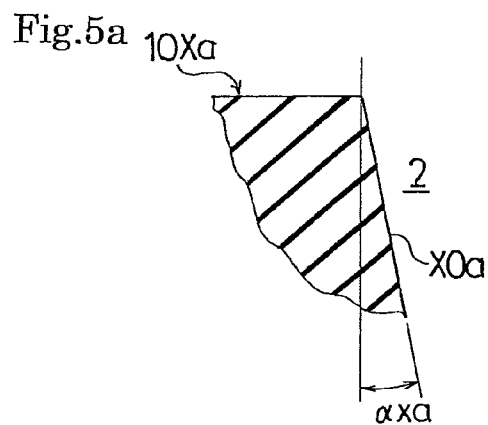
FIGS. 5a to 5d are partial enlarged cross-sectional views of first to fourth block portions of a block between the inner main groove and outer main groove on the left side of the equatorial plane of the tire, respectively, taken in a plane that contains the axis of rotation of the tire.
Figure 5B:
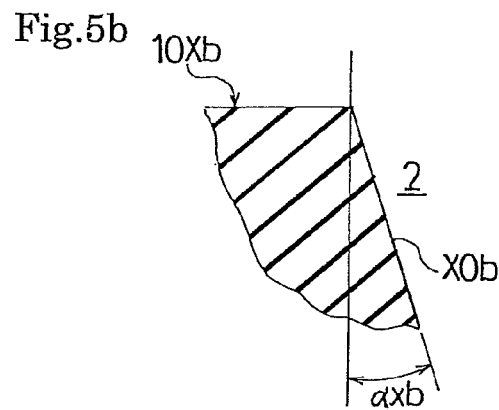
Figure 5C:
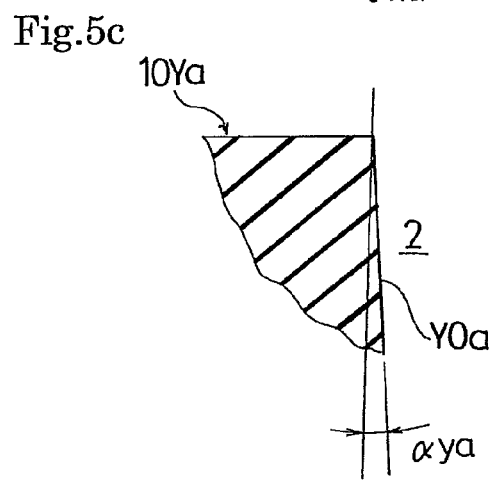
Figure 5D:
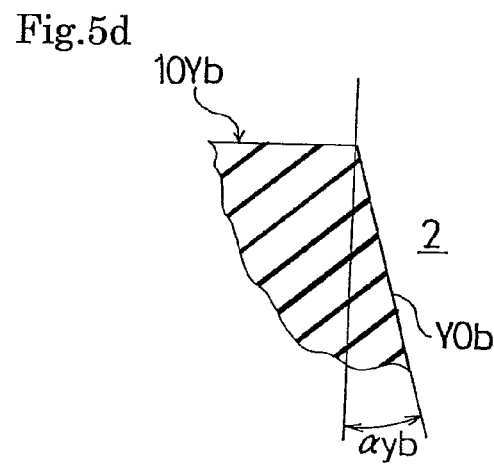
Figure 6A:
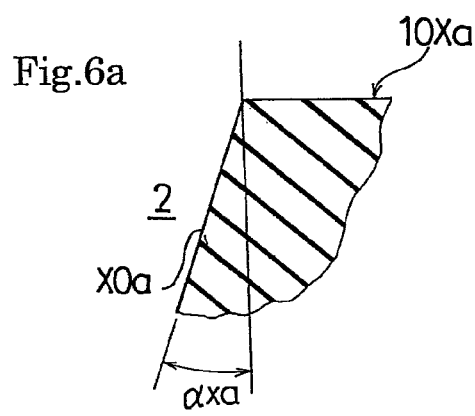
FIGS. 6a to 6d are partial enlarged cross-sectional views of first to fourth block portions of a block between the inner main groove and outer main groove on the right side of the equatorial plane of the tire, respectively, taken in a plane that contains the axis of rotation of the tire.
Figure 6B:
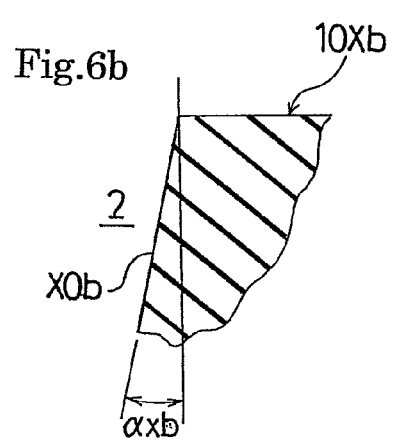
Figure 6C:
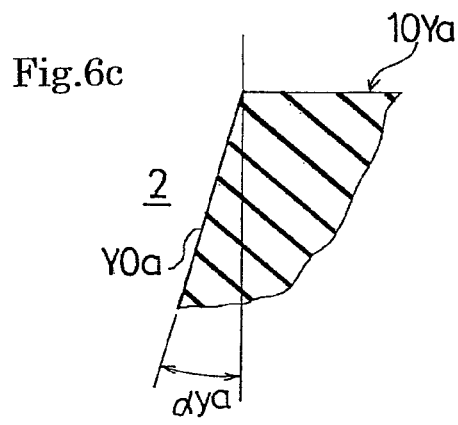
Figure 6D:
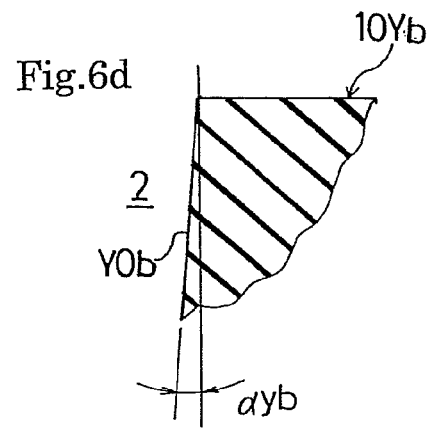
Figure 7A:
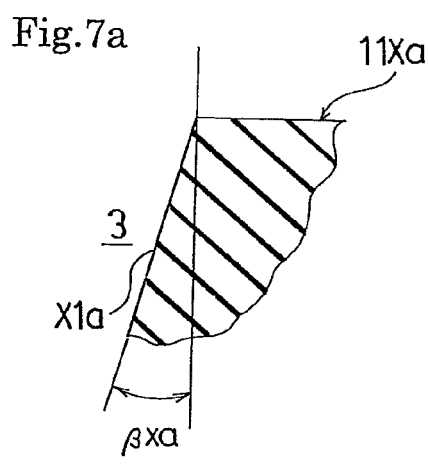
FIGS. 7a to 7d are partial enlarged cross-sectional views of first to fourth block portions of a block between the outer main groove and a circumferential groove on the left side of the equatorial plane of the tire, respectively, taken in a plane that contains the axis of rotation of the tire.
Figure 7B:
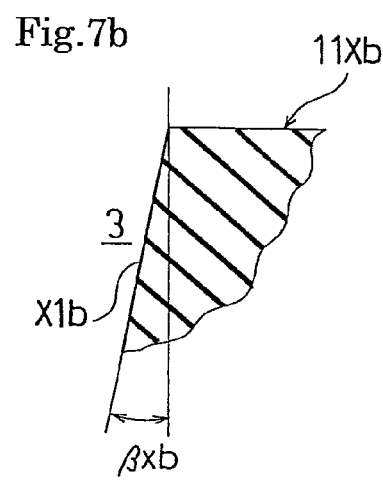
Figure 7C:
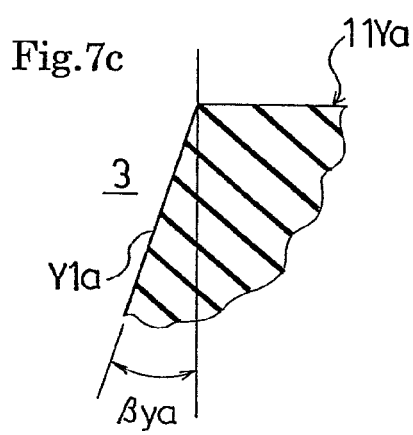
Figure 7D:
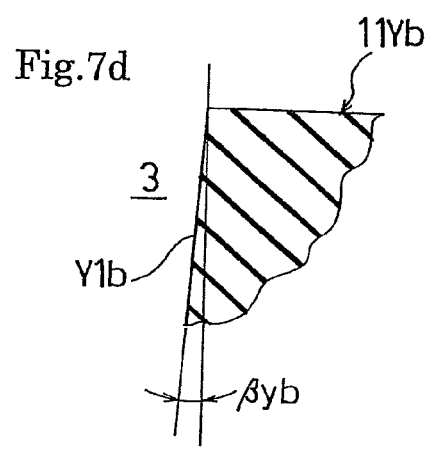
Figure 8A:
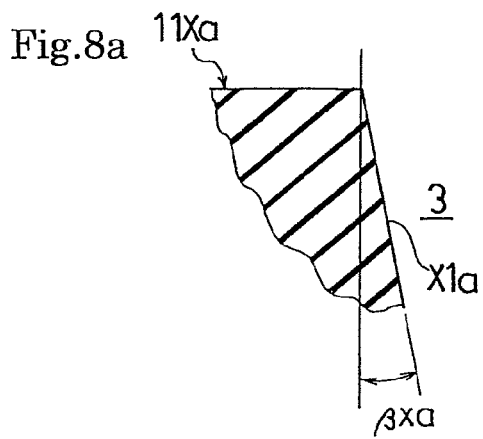
FIGS. 8a to 8d are partial enlarged cross-sectional views of first to fourth block portions of a block between the outer main groove and a circumferential groove on the right side of the equatorial plane of the tire, respectively, taken in a plane that contains the axis of rotation of the tire.
Figure 8B:
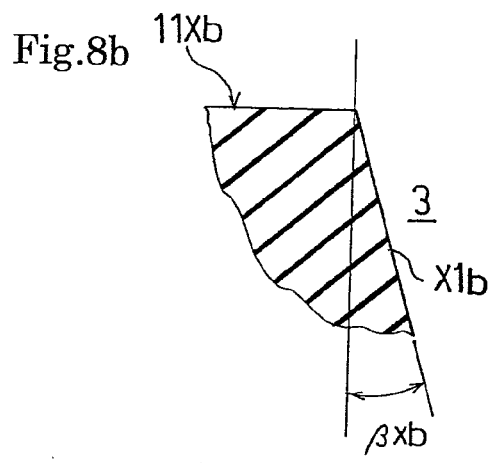
Figure 8C:
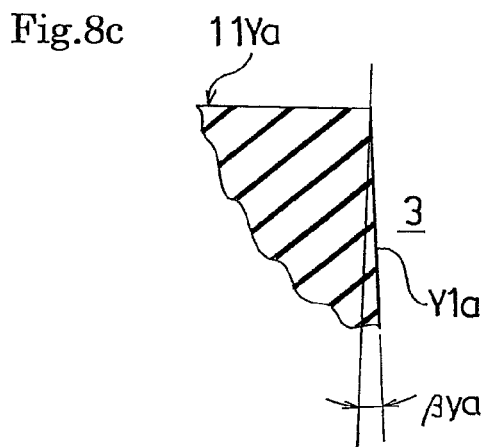
Figure 8D:
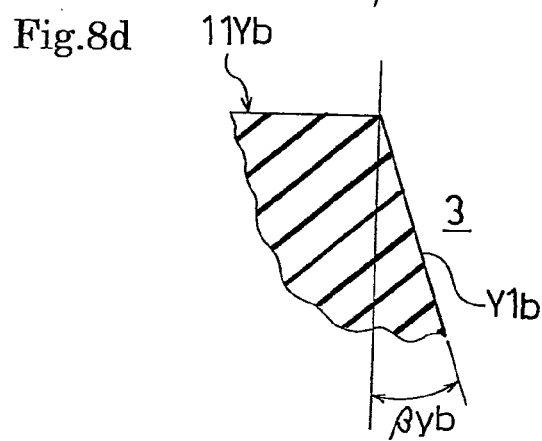

As shown in the enlarged drawing of FIG. 2, three sub-grooves 8 are disposed in each block 7 at prescribed intervals in the tire circumferential direction TC. The three sub-grooves 8 extend from an inner main groove 2 adjacent to the block 7 to a midway thereof in the tire width direction. Each sub-groove 8 extends parallel to the first lateral grooves 6. The sub-groove 8 does not communicate with the circumferential groove 5, and has an inner end located within the block 7. The block 7 has four block portions defined by the three sub-grooves 8 in the tire circumferential direction TC.

The four block portions comprise a first block portion 7A, a second block portion 7B, a third block portion 7C and a fourth block portion 7D. The four block portions have widths which are different from each other and are defined as lengths of the block portions between the inner main groove 2 and the circumferential groove 5 in the tire width direction on the tread surface 1. As shown in the enlarged drawing of FIG. 2, the width Wa of the first block portion 7A is greater than the width Wc of the third block portion 7C, the width Wc of the third block portion 7C is greater than the width Wd of the fourth block portion 7D, and the width Wd of the fourth block portion 7D is greater than the width Wb of the second block portion 7B; the width Wa of the first block portion 7A is the greatest and the width Wb of the second block portion 7B is the least. This changes the width of the inner main groove 2 adjacent to the block 7 in the tire circumferential direction TC. The way of making the widths of the block portions 7A, 7B, 7C and 7D different is not limited to the above, but may be one other than the above.

As shown in FIGS. 3a to 3d, the four block portions 7A, 7B, 7C and 7D have groove wall surfaces 7Ax, 7Bx, 7Cx and 7Dx facing the inner main groove 2. The groove wall surfaces 7Ax, 7Bx, 7Cx and 7Dx are each inclined with respect to a tread normal direction. If the inclination angle of the groove wall surface 7Ax of the first block portion 7A with respect to the tread normal direction is θa, if the inclination angle of the groove wall surface 7Bx of the second block portion 7B with respect to the tread normal direction is θb, if the inclination angle of the groove wall surface 7Cx of the third block portion 7C with respect to the tread normal direction is θc, and if the inclination angle of the groove wall surface 7Dx of the fourth block portion 7D with respect to the tread normal direction is θd, the relationship expressed by θb>θd>θc>θa is satisfied. The groove wall surface of a block portion less in width has a greater inclination angle with respect to the tread normal direction.

Note that the inclination angle θa of the groove wall surface 7Ax of the first block portion 7A with respect to the tread normal direction referred here is an angle between the groove wall surface 7Ax and a normal line Qa with respect to the ground contact face 7m of the block 7 in tire cross section taken in a plane that contains the axis of rotation of the tire, the normal line Qa passing a position Pa where the ground contact face 7m of the block 7 borders the groove wall surface 7Ax of the first block portion 7A. The inclination angle θb of the groove wall surface 7Bx of the second block portion 7B with respect to the tread normal direction is an angle between the groove wall surface 7Bx and a normal line Qb with respect to the ground contact face 7m of the block 7 in tire cross section taken in a plane that contains the axis of rotation of the tire, the normal line Qb passing a position Pb where the ground contact face 7m of the block 7 borders the groove wall surface 7Bx of the second block portion 7B. The inclination angle θc of the groove wall surface 7Cx of the third block portion 7C with respect to the tread normal direction is an angle between the groove wall surface 7Cx and a normal line Qc with respect to the ground contact face 7m of the block 7 in tire cross section taken in a plane that contains the axis of rotation of the tire, the normal line Qc passing a position Pc where the ground contact face 7m of the block 7 borders the groove wall surface 7Cx of the third block portion 7C. The inclination angle θd of the groove wall surface 7Dx of the fourth block portion 7D with respect to the tread normal direction is an angle between the groove wall surface 7Dx and a normal line Qd with respect to the ground contact face 7m of the block 7 in tire cross section taken in a plane that contains the axis of rotation of the tire, the normal line Qd passing a position Pd where the ground contact face 7m of the block 7 borders the groove wall surface 7Dx of the fourth block portion 7D. It should be noted that, if an edge portion where the ground contact face 7m of the block 7 borders the groove wall surface is chamfered, the position Pa, Pb, Pc, Pd is a position obtained in a state before chamfering.

Referring to FIG. 1, again, second lateral grooves 21 extending in the tire width direction are disposed at prescribed intervals (which are the same as those of the first lateral grooves 6) in the tire circumferential direction TC in the land portion 20 between each two adjacent inner and outer main grooves 2 and 3. A circumferential groove 9 less in width than the main grooves 2 and 3 extends straight in the tire circumferential direction TC at the center of the land portion 20 in the tire width direction. A plurality of blocks 10 and 11 are defined by the second lateral grooves 21, main grooves 2 and 3, and circumferential groove 9.

The second lateral grooves 21 each extend in an inclined manner with respect to the tire width direction, and have an inclination direction with respect to the tire width direction which is opposite to those of the first lateral grooves 21. As shown in the enlarged drawings of FIGS. 4a and 4b, each block 10 is sectioned into two small blocks (block portions) 10X and 10Y by a sub-groove 22 extending in the tire width direction from the inner main groove 2 to the circumferential groove 9. Each block 11 is sectioned into two small blocks (block portions) 11X and 11Y by a sub-groove 23 extending in the tire width direction from the outer main groove 3 to the circumferential groove 9. Each circumferential groove 22, 23 is disposed in a center region of the block 10, 11 in the tire circumferential direction TC.

A sub-groove 12 is disposed in a center region, in the tire circumferential direction TC, of each of the small blocks 10X and 10Y of the block 10 adjacent to the inner main groove 2. The sub-groove 12 extends outward in the tire width direction from the inner main groove 2 to a midway of the small block.

The sub-groove 12 extends substantially parallel to the second lateral grooves 21. The sub-groove 12 does not communicate with the circumferential groove 9, and has an inner end located within the small block 10X, 10Y. As shown in FIGS. 4a and 4b, the small block 10X has two block portions 10Xa and 10Xb defined by the sub-groove 12 in the tire circumferential direction TC. The small block 10Y has two block portions 10Ya and 10Yb defined by the sub-groove 12 in the tire circumferential direction TC. The block 10 has four block portions 10Xa, 10Xb, 10Ya and 10Yb.

The four block portions 10Xa, 10Xb, 10Ya and 10Yb of the block 10 have widths which are different from each other and are defined as lengths of the block portions between the inner main groove 2 and the circumferential groove 9 in the tire width direction on the tread surface 1. Referring to each block 10 on the left side of the tire equatorial plane TE, as shown in FIG. 4a, the width W0ya of the third block portion 10Ya is greater than the width W0xa of the first block portion 10Xa, the width W0xa of the first block portion 10Xa is greater than the width W0yb of the fourth block portion 10Yb, and the width W0yb of the fourth block portion 10Yb is greater than the width W0xb of the second block portion 10Xb; the width W0ya of the third block portion 10Ya is the greatest and the width W0xb of the second block portion 10Xb is the least. This further changes the width of the inner main groove 2 adjacent to the block 10 in the tire circumferential direction TC. The widths of the block portions 10Xa, 10Xb, 10Ya and 10Yb may also be made different in a manner other than the above.

As shown in FIGS. 5a to 5d, the four block portions 10Xa, 10Xb, 10Ya and 10Yb of the block 10 on the left side of the tire equatorial plane TE also have groove wall surfaces X0a, X0b, Y0a and Y0b facing the inner main groove 2. The groove wall surfaces X0a, X0b, Y0a and Y0b are each inclined with respect to a tread normal direction. If the inclination angle of the groove wall surface X0a of the first block portion 10Xa with respect to the tread normal direction is αxa, if the inclination angle of the groove wall surface X0b of the second block portion 10Xb with respect to the tread normal direction is αxb, if the inclination angle of the groove wall surface Y0a of the third block portion 10Ya with respect to the tread normal direction is αya, and if the inclination angle of the groove wall surface Y0b of the fourth block portion 10Yb with respect to the tread normal direction is αyb, the relationship expressed by αxb>αyb>αxa>αya is satisfied. The groove wall surface of a block portion less in width has a greater inclination angle with respect to the tread normal direction. Note that the inclination angles αxa, αxb, αya and αyb referred here are inclination angles measured in the same manner as the above inclination angles θa, θb, θc and θd.

Referring to each block 10 on the right side of the tire equatorial plane TE, as shown in FIG. 4b, the width W0yb of the fourth block portion 10Yb is greater than the width W0xb of the second block portion 10Xb, the width W0xb of the second block portion 10Xb is greater than the width W0ya of the third block portion 10Ya, and the width W0ya of the third block portion 10Ya is greater than the width W0xa of the first block portion 10Xa; the width W0yb of the fourth block portion 10Yb is the greatest and the width W0xa of the first block portion 10Xa is the least. This further changes the width of the inner main groove 2 adjacent to the block 10 in the tire circumferential direction TC. The widths of the block portions 10Xa, 10Xb, 10Ya and 10Yb may also be made different in a manner other than the above.

As shown in FIGS. 6a to 6d, the four block portions 10Xa, 10Xb, 10Ya and 10Yb of the block 10 on the right side of the tire equatorial plane TE also have groove wall surfaces X0a, X0b, Y0a and Y0b facing the inner main groove 2. The groove wall surfaces X0a, X0b, Y0a and Y0b are each inclined with respect to a tread normal direction. If the inclination angle of the groove wall surface X0a of the first block portion 10Xa with respect to the tread normal direction is αxa, if the inclination angle of the groove wall surface X0b of the second block portion 10Xb with respect to the tread normal direction is αxb, if the inclination angle of the groove wall surface Y0a of the third block portion 10Ya with respect to the tread normal direction is αya, and if the inclination angle of the groove wall surface Y0b of the fourth block portion 10Yb with respect to the tread normal direction is αyb, the relationship expressed by αxa>αya>αxb>αyb is satisfied. The groove wall surface of a block portion less in width has a greater inclination angle with respect to the tread normal direction. Note that the inclination angles αxa, αxb, αya and αyb referred here are also inclination angles measured in the same manner as the above inclination angles θa, θb, θc and θd.

A sub-groove 13 is disposed in a center region, in the tire circumferential direction TC, of each of the small blocks 11X and 11Y of the block 11 adjacent to the outer main groove 3. The sub-groove 13 extends inward in the tire width direction from the outer main groove 3 to a midway of the small block. The sub-groove 13 extends substantially parallel to the second lateral grooves 21. The sub-groove 13 does not communicate with the circumferential groove 9, and has an inner end located within the small block 11X, 11Y. As shown in FIGS. 4a and 4b, the small block 11X has two block portions 11Xa and 11Xb defined by the sub-groove 13 in the tire circumferential direction TC. The small block 11Y has two block portions 11Ya and 11Yb defined by the sub-groove 13 in the tire circumferential direction TC. The block 11 has four block portions 11Xa, 11Xb, 11Ya and 11Yb.

The four block portions 11Xa, 11Xb, 11Ya and 11Yb of the block 11 have widths which are different from each other and are defined as lengths of the block portions between the outer main groove 3 and the circumferential groove 9 in the tire width direction on the tread surface 1. Referring to each block 11 on the left side of the tire equatorial plane TE, as shown in FIG. 4a, the width W1yb of the fourth block portion 11Yb is greater than the width W1xb of the second block portion 11Xb, the width W1xb of the second block portion 11Xb is greater than the width W1xa of the first block portion 11Xa, and the width W1xa of the first block portion 11Xa is greater than the width W1ya of the third block portion 11Ya; the width W1yb of the fourth block portion 11Yb is the greatest and the width W1ya of the third block portion 11Ya is the least. This changes the width of the outer main groove 3 adjacent to the block 11 in the tire circumferential direction TC. The widths of the block portions 11Xa, 11Xb, 11Ya and 11Yb may also be made different in a manner other than the above.

As shown in FIGS. 7a to 7d, the four block portions 11Xa, 11Xb, 11Ya and 11Yb of the block 11 on the left side of the tire equatorial plane TE also have groove wall surfaces X1a, X1b, Y1a and Y1b facing the outer main groove 3. The groove wall surfaces X1a, X1b, Y1a and Y1b are each inclined with respect to a tread normal direction. If the inclination angle of the groove wall surface X1a of the first block portion 11Xa with respect to the tread normal direction is βxa, if the inclination angle of the groove wall surface X1b of the second block portion 11Xb with respect to the tread normal direction is βxb, if the inclination angle of the groove wall surface Y1a of the third block portion 11Ya with respect to the tread normal direction is βya, and if the inclination angle of the groove wall surface Y1b of the fourth block portion 11Yb with respect to the tread normal direction is βyb, the relationship expressed by βya>βxa>βxb>βyb is satisfied. The groove wall surface of a block portion less in width has a greater inclination angle with respect to the tread normal direction. Note that the inclination angles βxa, βxb, βya and βyb referred here are also inclination angles measured in the same manner as the above inclination angles θa, θb, θc and θd.

Referring to each block 11 on the right side of the tire equatorial plane TE, as shown in FIG. 4b, the width W1ya of the third block portion 11Ya is greater than the width W1xa of the first block portion 11Xa, the width W1xa of the first block portion 11Xa is greater than the width W1xb of the second block portion 11Xb, and the width W1xb of the second block portion 11Xb is greater than the width W1yb of the fourth block portion 11Yb; the width W1ya of the third block portion 11Ya is the greatest and the width W1yb of the fourth block portion 11Yb is the least. This changes the width of the outer main groove 3 adjacent to the block 11 in the tire circumferential direction TC. The widths of the block portions 11Xa, 11Xb, 11Ya and 11Yb may also be made different in a manner other than the above.

As shown in FIGS. 8a to 8d, the four block portions 11Xa, 11Xb, 11Ya and 11Yb of the block 11 on the right side of the tire equatorial plane TE also have groove wall surfaces X1a, X1b, Y1a and Y1b facing the outer main groove 3. The groove wall surfaces X1a, X1b, Y1a and Y1b are each inclined with respect to a tread normal direction. If the inclination angle of the groove wall surface X1a of the first block portion 11Xa with respect to the tread normal direction is βxa, if the inclination angle of the groove wall surface X1b of the second block portion 11Xb with respect to the tread normal direction is βxb, if the inclination angle of the groove wall surface Y1a of the third block portion 11Ya with respect to the tread normal direction is βya, and if the inclination angle of the groove wall surface Y1b of the fourth block portion 11Yb with respect to the tread normal direction is βyb, the relationship expressed by βyb>βxb>βxa>βya is satisfied. The groove wall surface of a block portion less in width has a greater inclination angle with respect to the tread normal direction. Note that the inclination angles βxa, βxb, βya and βyb referred here are also inclination angles measured in the same manner as the above inclination angles θa, θb, θc and θd.

Referring to FIG. 1, again, third lateral grooves 14 are disposed at prescribed intervals in the tire circumferential direction TC in a shoulder region of the tread surface 1 located outward of each outer main groove 8 in the tire width direction. The third lateral grooves 14 extend from the outer main groove 3 beyond a ground contact end TX of the tire. A plurality of blocks 15 are defined by third lateral grooves 14 and outer main groove 3. Each block 15 has a circumferential groove 16 which is less in width than the outer main groove 3 and extends in the tire circumferential direction TC. A sub-groove 17, which extends in the tire width direction from the circumferential groove 16 beyond the tire ground contact end TX, is disposed in each block 15. Each block 15 is sectioned into small blocks 15A, 15B and 15C by the circumferential groove 16 and sub-groove 17.

In FIG. 1, reference numeral 18 denotes sipes provided in each of the blocks 7, 10, 11 and 15.

According to the present invention described above, an edge effect due to the sub-grooves 8, 12, 13, 22 and 23 can be obtained, and expelling of snow which has entered into the main grooves 2 and 3 can be facilitated by making the widths of the four block portions of the blocks 7, 10 and 11 different from each other to change the widths of the main grooves 2 and 3 in a multi-step manner. Therefore, steering stability on a snowy road surface can be improved.

Further, the groove wall surface of a block portion with a less width facing a main groove adjacent thereto has a greater inclination angle with respect to the tread normal direction, whereby stiffness of the block portions in the tire width direction can be made more even. Accordingly, steering stability on a dry road surface can be improved.

In the present invention, the inclination angle θb of the groove wall surface 7Bx of the second block portion 7B with the least width Wb with respect to the tread normal direction is preferably in the range of 10° to 25°. The inclination angle θa of the groove wall surface 7Ax of the first block portion 7A with the greatest width Wa with respect to the tread normal direction is preferably in the range of 0° to 10°. The inclination angles θc and θd of the groove wall surfaces 7Cx and 7Dx of the block portions 7C and 7D can be properly chosen according to the widths of the block portions in a range that the inclination angles θc and θd are less than the inclination angle θb and are greater than the inclination angle θa.

If the inclination angle θb of the groove wall surface 7Bx of the second block portion 7B is less than 10°, steering stability on a dry road surface is degraded because sufficient stiffness of the second block portion 7B is not obtained. If the inclination angle θb of the groove wall surface 7Bx of the second block portion 7B is greater than 25°, steering stability on a snowy road surface is deteriorated when the groove volume is too low, because an effect of clearing snow by the groove wall surface 7Bx is lowered during cornering. If the inclination angle θa of the groove wall surface 7Ax of the first block portion 7A is less than 0°, there is a risk of damaging the first block portion 7A when the tire is removed from a tire mold, because the groove wall surface 7Ax is inclined oppositely with respect to the tread normal direction. If the inclination angle θa of the groove wall surface 7Ax of the first block portion 7A is greater than 10°, steering stability on a snowy road surface is deteriorated because the volume of a main groove adjacent thereto decreases.

A difference D between the width Wb of the second block portion 7B having the least width and the width Wa of the first block portion 7A having the greatest width is preferably in the range of 1 mm to 4 mm. If the difference D is under 1 mm, sufficient traction on a snowy road surface is not obtained because edge components effectively acting on a snow surface are reduced. If the difference D is beyond 4 mm, the first block portion 7A becomes a state where it greatly protrudes toward the main groove side when stiffness of the second block portion 7B is ensured, which degrades snow-expelling characteristics due to a decrease in the main groove area. Therefore, steering stability on a snowy road surface is deteriorated.

The blocks 10 can also be arranged in a similar manner to the above. More specifically, the inclination angle αxb, with respect to the tread normal direction, of the groove wall surface X0b of the second block portion 10Xb, with the least width W0xb, of each block 10 on the left side of the tire equatorial plane TE, and the inclination angle αxa, with respect to the tread normal direction, of the groove wall surface X0a of the first block portion 10Xa, with the least width W0xa, of each block 10 on the right side of the tire equatorial plane TE are preferably in the range of 10° to 25° from the same reason as the above. The inclination angle αya, with respect to the tread normal direction, of the groove wall surface Y0a of the third block portion 10Ya, with the greatest width W0ya, of each block 10 on the left side of the tire equatorial plane TE, and the inclination angle αyb, with respect to the tread normal direction, of the groove wall surface Y0b of the fourth block portion 10Yb, with the greatest width W0yb, of each block 10 on the right side of the tire equatorial plane TE are preferably in the range of 0° to 10° from the same reason as the above. The inclination angles αxa and αyb of the groove wall surfaces X0a and Y0b of the block portions 10Xa and 10Yb of the block 10 on the left side of the tire equatorial plane TE can be properly chosen according to the widths of the block portions in a range that the inclination angles αxa and αyb are less than the inclination angle αxb of the groove wall surface X0b of the second block portion 10Xb of the block 10 on the left side of the tire equatorial plane TE and are greater than the inclination angle αya of the groove wall surface Y0a of the third block portion 10Ya of the block 10 on the left side of the tire equatorial plane TE. The inclination angles αxb and αya of the groove wall surfaces X0b and Y0a of the block portions 10Xb and 10Ya of the block 10 on the right side of the tire equatorial plane TE can be properly chosen according to the widths of the block portions in a range that the inclination angles αxb and αya are less than the inclination angle αxa of the groove wall surface X0a of the first block portion 10Xa of the block 10 on the right side of the tire equatorial plane TE and are greater than the inclination angle αyb of the groove wall surface Y0b of the fourth block portion 10Yb of the block 10 on the right side of the tire equatorial plane TE.

The blocks 11 can also be arranged in a similar manner to the above. More specifically, the inclination angle βya, with respect to the tread normal direction, of the groove wall surface Y1a of the third block portion 11Ya, with the least width W1ya, of each block 11 on the left side of the tire equatorial plane TE, and the inclination angle βyb, with respect to the tread normal direction, of the groove wall surface Y1b of the fourth block portion 11Yb, with the least width W1yb, of each block 11 on the right side of the tire equatorial plane TE are preferably in the range of 10° to 25° from the same reason as the above. The inclination angle βyb, with respect to the tread normal direction, of the groove wall surface Y1b of the fourth block portion 11Yb, with the greatest width W1yb, of each block 11 on the left side of the tire equatorial plane TE, and the inclination angle βya, with respect to the tread normal direction, of the groove wall surface Y1a of the third block portion 11Ya, with the greatest width W1ya, of each block 11 on the right side of the tire equatorial plane TE are preferably in the range of 0° to 10° from the same reason as the above. The inclination angles βxa and βxb of the groove wall surfaces X1a and X1b of the block portions 11Xa and 11Xb of the block 11 on the left side of the tire equatorial plane TE can be properly chosen according to the widths of the block portions in a range that the inclination angles βxa and βxb are less than the inclination angle βya of the groove wall surface Y1a of the third block portion 11Ya of the block 11 on the left side of the tire equatorial plane TE and are greater than the inclination angle βyb of the groove wall surface Y1b of the fourth block portion 11Yb of the block 11 on the left side of the tire equatorial plane TE. The inclination angles βxa and βxb of the groove wall surfaces X1a and X1b of the block portions 11Xa and 11Xb of the block 11 on the right side of the tire equatorial plane TE can be properly chosen according to the widths of the block portions in a range that the inclination angles βxa and βxb are less than the inclination angle βyb of the groove wall surface Y1b of the fourth block portion 11Yb of the block 11 on the right side of the tire equatorial plane TE and are greater than the inclination angle βya of the groove wall surface Y1a of the third block portion 11Ya of the block 11 on the right side of the tire equatorial plane TE.

The main grooves 2 and 3 with the widths varied by the blocks 7, 10 and 11 are so-called see-through grooves which can be seen through from one ends of the main grooves 2 and 3 to the other ends thereof when the tread surface 1 is fully developed around the entire circumference of the tire. It is preferable in terms of obtaining good snow-expelling characteristics and snow traction in the tire width direction that a ratio of the groove area of the see-through part of each see-through groove to the area of a tire ground contact surface section of the tread surface 1 between the ground contact ends TX of the tire be equal to or more than 3%, and the sum of the ratios of the groove areas of the see-through parts of the four see-through grooves to the area of the tire ground contact surface section of the tread surface 1 between the ground contact ends TX of the tire be 12% to 18%. If the ratio of the groove area of the see-through part of each see-through groove is less than 3%, snow-expelling characteristics are deteriorated and it is difficult to obtain snow traction in the tire width direction. If the sum of the ratios of the groove areas of the see-through parts is greater than 18%, block stiffness is lowered, which degrades steering stability on a dry road surface. Note that the ground contact ends TX of the tire referred here are tire ground contact ends when measured under conditions that a pneumatic tire is assembled to a standard rim and inflated to 80% of the maximum air pressure corresponding to the maximum load capacity specified by JATMA (Japan Automobile Tire Manufacturer Association), TRA (US Tire and Rim Association) or ETRTO (European Tire and Rim Technical Organization) and a load equivalent to 80% of the maximum load capacity is applied thereto.

Figure 9:
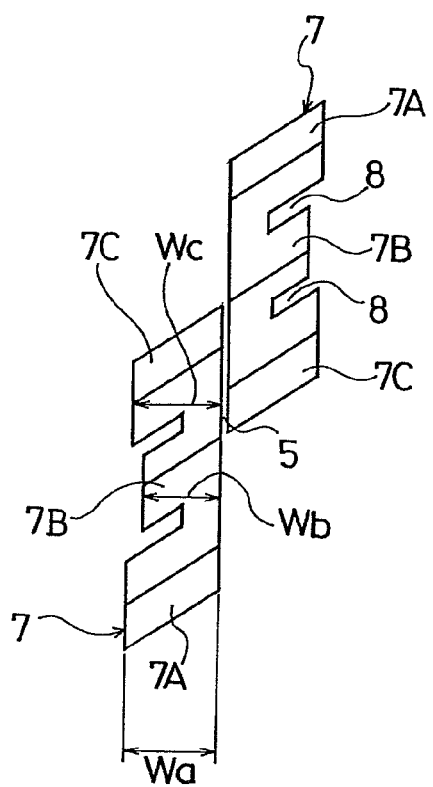
FIG. 9 is an enlarged view showing another example of blocks between the inner main grooves.

In the above embodiment, the block 7 has four block portions 7A, 7B, 7C and 7D defined by the three sub-grooves 8. However, as shown in FIG. 9, the block 7 may have at least three block portions (first block portion 7A, second block portion 7B and third block portion 7C) defined in the tire circumferential direction TC by at least two sub-grooves 8 disposed in the block 7 at a prescribed interval in the tire circumferential direction TC. The width of the inner main groove 2 adjacent the block 7 is changed by making the widths Wa, Wb and Wc of the at least three block portions 7A, 7B and 7C different, and the groove wall surface of a block portion less in width has a greater inclination angle with respect to the tread normal direction. In the block 7 shown in FIG. 1, three of the four block portions 7A, 7B, 7C and 7D may have widths different from each other, whereby an effect similar to the above can be obtained.

The block 7 may have at least three block portions defined by sub-grooves extending from the inner main groove 2 to the circumferential groove 5, instead of the sub-grooves 8 extending to the midway. Alternatively, the block 7 may have at least three block portions defined by a sub-groove 8 extending to the midway thereof and a sub-groove traversing the block, similarly to the above blocks 10 and 11.

The block 10, 11 may also have at least three block portions defined by only sub-grooves 12, 13 extending to the midway. Instead, the block 10, 11 may also have at least three block portions defined by only sub-grooves 22, 23 traversing the block.

In the above embodiment, four main grooves 2 and 3 provided in the tread surface 1 are exemplified. However, the pneumatic tire of the present invention may be one having three main grooves provided in the tread surface 1, the three main grooves having an inner main groove 2 disposed on the tire equatorial plane TE and two outer main grooves 3 disposed on the opposite sides of the inner main groove 2.

It is desirable from the viewpoint of realizing both snow performance and dry performance that the blocks 7 and 10 adjacent to each other on the opposite sides of the main groove 2 be structured such that a block portion of the block 7 greater in width faces a block portion of the block 10 less in width. The same goes for the blocks 11 and 18 adjacent to each other on the opposite sides of the main groove 3.

The present invention is preferably applicable to pneumatic tires for all seasons, used for passenger cars such as SUVs (sport utility vehicles) having an aspect ratio of 55% or less in particular. However, there is no limitation thereto.

EXAMPLE

Prepared respectively were test tires according to the present invention tires 1 to 4 (present examples 1 to 4) and comparative tires 1 to 3 (comparative examples 1 to 3), each having a tire size of 275/45R20, the present invention tire 1 having a tread pattern of FIG. 1 except that the land portion between the inner main grooves comprised blocks shown in FIG. 9 and the land portion between each two adjacent inner and outer main grooves comprised blocks each having a constant width, the present invention tire 2 having a tread pattern of FIG. 1 except that the land portion between the inner main grooves and the land portion between each two adjacent inner and outer main grooves comprised blocks shown in FIG. 9, the present invention tire 3 having a tread pattern of FIG. 1 except that the land portion between each two adjacent inner and outer main grooves comprised blocks each having a constant width, the present invention tire 4 having a tread pattern of FIG. 1, the comparative tire 1 having the same structure as the present invention tire 1 except that the block portions of each block of the land portion between the inner main grooves were equal in width and had only one kind of block width, the comparative tire 2 having the same structure as the present invention tire 3 except that each of the blocks between the inner main grooves were arranged such that the first block portion had the same width as the third block portion and the second block portion had the same width as the third block portion and the four block portions had two kinds of block widths and the inclination angles of the groove wall surfaces of the first to fourth block portions were equal (0°), the comparative tire 3 having the same structure as the present invention tire 3 except that the inclination angles of the groove wall surfaces of the block portions of each block between the inner main grooves were equal (5°). In the test tires, the inclination angles of the groove wall surfaces of the block portions and the differences D are as shown in Table 1.

The respective test tires were assembled to rims having a rim size of 20×9 J, inflated to an air pressure of 240 kPa, and mounted on a vehicle of 3400 cc displacement. Evaluation testing for dry steering stability and snow steering stability was carried out according to the following methods, obtaining the results shown in Table 1.

Dry Steering Stability

The car was run on a test course with a dry road surface, and feeling evaluation for steering stability was conducted by a test driver. The evaluation result is represented by an index where the comparative tire 1 is 100. As the index is greater, steering stability on a dry road surface is better.

Snow Steering Stability

The car was run on a test course with a snowy road surface, and feeling evaluation for steering stability was conducted by a test driver. The evaluation result is represented by an index where the comparative tire 1 is 100. As the index is greater, steering stability on a snowy road surface is better.

TABLE 1

|  | Present Example 1 | Present Example 2 | Presnet Example 3 | Present Example 4 |
|---|---|---|---|---|
| Land Portion | Land Portion between Inner Main Grooves | Land Portion between Each Two Adjacent Main Grooves | Land Portion between Inner Main Grooves | Land Portion between Each Two Adjacent Main Grooves |
| Inclination Angle (°) of Groove Wall Sueface of First Block Portion | 5 | 5 | 5 | 5 |
| Inclination Angle (°) of Groove Wall Sueface of Second Block Portion | 15 | 15 | 15 | 15 |
| Inclination Angle (°) of Groove Wall Sueface of Third Block Portion | 10 | 10 | 7 | 7 |
| Inclination Angle (°) of Groove Wall Sueface of Fourth Block Portion | — | — | 12 | 12 |
| Differnece D (mm) | 1 | 3 | 2 | 4 |
| Dry Steering Stability | 105 | 109 | 108 | 110 |
| Snow Steering Stability | 105 | 107 | 108 | 110 |

|  | Comparative Example 1 | Comparative Example 2 | Comparative Example 3 |
|---|---|---|---|
| Land Portion | — | — | — |
| Inclination Angle (°) of Groove Wall Sueface of First Block Portion | 0 | 0 | 5 |
| Inclination Angle (°) of Groove Wall Sueface of Second Block | 0 | 0 | 5 |

TABLE 1-continued

| Portion | | | |
|---|---|---|---|
| Inclination Angle (°) of Groove Wall Sueface of Third Block Portion | 0 | 0 | 5 |
| Inclination Angle (°) of Groove Wall Sueface of Fourth Block Portion | — | 0 | 5 |
| Differnece D (mm) | 0 | 2 | 2 |
| Dry Steering Stability | 100 | 100 | 102 |
| Snow Steering Stability | 100 | 102 | 103 |

As seen from Table 1, the present invention tires have indexes of steering stability on a dry road surface and on a snowy road surface which are 105 or more, and can effectively improve steering stability both on a dry road surface and on a snowy road surface.

What is claimed is:

1. A pneumatic tire having a tread surface, a plurality of main grooves extending in a circumferential direction of the tire in the tread surface, land portions being defined by the plurality of main grooves, the land portions having at least one land portion between two adjacent main grooves, a circumferential groove less in width than the main grooves extending in the tire circumferential direction in the at least one land portion, wherein;
   lateral grooves are disposed in the at least one land portion at prescribed intervals in the tire circumferential direction, the lateral grooves extending from each main groove adjacent to the at least one land portion to the circumferential groove;
   a plurality of blocks are defined by the main grooves, circumferential groove and lateral grooves;
   sub-grooves are disposed in each block at a prescribed interval in the tire circumferential direction, the sub-grooves extending from the main groove to at least a midway of the block in the tire width direction;
   at least three block portions are defined by the sub-grooves in the tire circumferential direction;
   the at least three block portions have widths different from each other in the tire width direction, whereby the main groove adjacent to the each block has a variable width;
   the at least three block portions have groove wall surfaces facing the main groove, the groove wall surface of a block portion less in width having a greater inclination angle with respect to a tread normal direction;
   a difference between the width of a block portion of the at least three block portions which is the least in width and the width of a block portion of the at least three block portions which is the greatest in width is 1 mm to 4 mm; and
   wherein the sub-grooves comprise three sub-grooves extending to the midway of the block, and wherein four of said block portions are defined by the three sub-grooves in the tire circumferential direction.

2. The pneumatic tire according to claim 1, wherein the groove wall surface, facing the main groove, of a block portion of the four block portions which is the least in width has an inclination angle of 10° to 25° with respect to the tread normal direction, and wherein the groove surface, facing the main groove, of a block portion of the four block portions which is the greatest in width has an inclination angle of 0° to 10° with respect to the tread normal direction.

3. The pneumatic tire according to claim 1, wherein the groove wall surface, facing the main groove, of a block portion of the four block portions which is the least in width has an inclination angle of 10° to 25° with respect to the tread normal direction, and wherein the groove surface, facing the main groove, of a block portion of the four block portions which is the greatest in width has an inclination angle of 0° to 10° with respect to the tread normal direction.

4. The pneumatic tire according to claim 1, wherein the plurality of main grooves comprise two inner main grooves disposed on opposite sides of an equatorial plane of the tire and two outer main grooves disposed outwardly of the two inner main grooves in the tire width direction, the at least one land portion including a land portion between the two inner main grooves.

5. The pneumatic tire according to claim 4, wherein the at least one land portion includes a land portion between an inner main groove and an outer main groove adjacent thereto.

6. The pneumatic tire according to claim 1, wherein the plurality of main grooves comprise one main groove disposed on an equatorial plane of the tire and two main grooves disposed on opposite sides of the one main groove, the at least one land portion includes a land portion between each two adjacent main grooves.

* * * * *